(12) United States Patent
Wang et al.

(10) Patent No.: US 11,186,258 B2
(45) Date of Patent: Nov. 30, 2021

(54) METHOD AND SYSTEM FOR CONTROLLING A VEHICLE, AND FINGERPRINT CHIP

(71) Applicant: SHENZHEN GOODIX TECHNOLOGY CO., LTD., Guangdong (CN)

(72) Inventors: Bo Wang, Shenzhen (CN); Bing Wang, Shenzhen (CN); Wenbin Sun, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/691,360

(22) Filed: Nov. 21, 2019

(65) Prior Publication Data

US 2021/0009081 A1    Jan. 14, 2021

(30) Foreign Application Priority Data

Jul. 10, 2019  (CN) .......................... 201910619518.6

(51) Int. Cl.
*B60R 25/25*  (2013.01)
*B60W 40/08*  (2012.01)
(Continued)

(52) U.S. Cl.
CPC ........ *B60R 25/252* (2013.01); *B60R 25/2081* (2013.01); *B60W 40/08* (2013.01);
(Continued)

(58) Field of Classification Search
CPC ... B60R 25/252; B60R 25/2081; B60R 25/25; B60R 16/037; B60R 25/04;
(Continued)

(56) References Cited

U.S. PATENT DOCUMENTS 6,078,265 A  *  6/2000  Bonder .............. G07C 9/00563
                                          340/5.23
6,100,811 A  *  8/2000  Hsu .................... B60H 1/00642
                                          340/426.36
(Continued)

FOREIGN PATENT DOCUMENTS

CN           203580840 U       5/2014
CN           206193830 U       5/2017
(Continued)

OTHER PUBLICATIONS

Extended European Search Report dated Dec. 13, 2019, Patent Application No. 19182159.4-1221, 8 pages.
(Continued)

*Primary Examiner* — Edwin C Holloway, III
(74) *Attorney, Agent, or Firm* — Davis Wright Tremaine LLP

(57) ABSTRACT

Embodiments of the present disclosure relate to vehicle technologies, and disclose a method and system for controlling a vehicle, and a fingerprint chip. The method comprises: collecting a fingerprint image of a user; authenticating the user according to the fingerprint image and acquiring identity information of the user after the authentication succeeds; acquiring a vehicle personalization parameter of the user according to the identity information of the user and setting up the vehicle according to the vehicle personalization parameter. The embodiments further provide a vehicle control system and a fingerprint chip. The technical solutions provided by the embodiments of the present disclosure can allow simple and quick personalized settings of a vehicle based on identity recognition, which can facilitate sharing a vehicle among family members in most cases.

19 Claims, 7 Drawing Sheets

(51) Int. Cl.
*G06K 9/00* (2006.01)
*G06F 21/32* (2013.01)
*B60R 25/20* (2013.01)

(52) U.S. Cl.
CPC ............ *G06F 21/32* (2013.01); *G06K 9/0012* (2013.01); *G06K 9/00013* (2013.01); *B60W 2040/0809* (2013.01); *B60W 2420/40* (2013.01); *B60W 2420/42* (2013.01); *B60W 2540/043* (2020.02)

(58) Field of Classification Search
CPC ................ B60R 16/023; B60W 40/08; B60W 2540/043; B60W 2040/0809; B60W 2420/40; B60W 2420/42; B60W 2540/06; G06F 21/32; G06K 9/00013; G06K 9/0012; G06K 9/00107; G06K 9/0002; G06K 9/00006; G06K 9/00114; G07C 9/00563; G07C 9/25; G07C 9/253; G07C 9/37; G07C 2209/02
USPC ...................... 340/5.53, 5.83, 5.72
See application file for complete search history.

(56) References Cited

U.S. PATENT DOCUMENTS

| | | | |
|---|---|---|---|
| 6,140,939 A * | 10/2000 | Flick | B60R 25/04 340/12.28 |
| 6,271,745 B1 * | 8/2001 | Anzai | G07C 9/00563 340/5.53 |
| 2002/0048391 A1 * | 4/2002 | Kim | B60R 25/04 382/124 |
| 2003/0204290 A1 * | 10/2003 | Sadler | G06K 9/00362 701/1 |
| 2005/0073196 A1 * | 4/2005 | Kamiya | B60R 25/252 307/10.3 |
| 2011/0141040 A1 | 6/2011 | Kang et al. | |
| 2013/0096733 A1 * | 4/2013 | Manotas, Jr. | F02N 11/0807 701/2 |
| 2014/0156149 A1 * | 6/2014 | Feit | B60R 25/252 701/49 |
| 2015/0019873 A1 * | 1/2015 | Hagemann | G06F 21/32 713/186 |
| 2015/0217726 A1 * | 8/2015 | Lee | B60K 28/02 701/1 |
| 2016/0012656 A1 * | 1/2016 | Chuang | G07C 9/25 340/5.52 |
| 2017/0057436 A1 * | 3/2017 | Dow | B60N 2/0224 |
| 2018/0336390 A1 | 11/2018 | Liu et al. | |
| 2020/0026370 A1 * | 1/2020 | Shin | G06F 21/32 |

FOREIGN PATENT DOCUMENTS

| | | |
|---|---|---|
| CN | 107704795 A | 2/2018 |
| CN | 207374297 U | 5/2018 |
| CN | 108153445 A | 6/2018 |
| CN | 208106124 U | 11/2018 |
| CN | 110040088 A | 7/2019 |
| DE | 19900032 A1 | 7/2000 |
| GB | 2388694 A | 11/2003 |
| KR | 101658139 B1 | 9/2016 |

OTHER PUBLICATIONS

Extended European Search Report dated May 26, 2020, Patent Application No. 19209152.8-1207, 9 pages.
Chinese First Office Action dated Feb. 22, 2021, Patent Application No. 201910619518.6, 13 pages.

* cited by examiner

METHOD AND SYSTEM FOR CONTROLLING A VEHICLE, AND FINGERPRINT CHIP

CROSS-REFERENCE TO RELATED APPLICATION

The present application claims the benefit of priority of Chinese Patent Application No. 201910619518.6, filed on Jul. 10, 2019, which is hereby incorporated by reference in its entirety.

FIELD

Embodiments of the present disclosure relate to vehicle technologies, and more particularly, to a method and system for controlling a vehicle, and a fingerprint chip.

BACKGROUND

With continuous development of national economy and improvement of living standards, family cars are becoming more and more popular. Presently, it is common that one family owns one car. When a family member uses a car, he/she usually starts the car with a car key and then adjusts a seat position, mirror angles, and air conditioning temperature, etc. according to his/her needs and preferences.

The inventor(s) find that existing technologies at least have an issue that if different family members share one vehicle, usually each family member has to make adjustments to in-vehicle devices when using the vehicle, such as the seat position, mirror angles, and air conditioning temperature, etc. as mentioned above. This can be relatively inconvenient.

SUMMARY

Some embodiments of the present disclosure aim to provide a method and a system for controlling a vehicle, and a fingerprint chip, which can allow simple and quick personalized settings of a vehicle based on identity recognition, thereby facilitating sharing a vehicle among family members in most cases.

In order to solve the above-described technical problem, some embodiments of the present disclosure provide a method for controlling a vehicle, including: collecting a fingerprint image of a user; authenticating the user according to the fingerprint image, and acquiring identity information of the user after the authentication succeeds; acquiring a vehicle personalization parameter of the user according to the identity information of the user, and setting up the vehicle according to the vehicle personalization parameter.

Some embodiments of the present disclosure provide a system for controlling a vehicle, including: a fingerprint sensor, configured to collect a fingerprint image of a user; a fingerprint processing module, configured to authenticate the user according to the fingerprint image, and acquire identity information of the user after the authentication succeeds; and a vehicle setting module, configured to acquire a vehicle personalization parameter of the user according to the identity information of the user, and set up the vehicle according to the vehicle personalization parameter.

Some embodiments of the present disclosure provide a fingerprint chip, wherein the fingerprint chip is mounted on a vehicle, and the fingerprint chip comprises: a fingerprint sensor configured to collect a fingerprint image of a user; and a microprocessor configured to authenticate the user according to the fingerprint image, and acquire identity information of the user after the authentication succeeds, so that a central control device of the vehicle acquires a vehicle personalization parameter of the user according to the identity information of the user and sets up the vehicle according to the vehicle personalization parameter.

As compared with existing technologies, in some embodiments of the present disclosure, the identity information of the user is acquired after the authentication of the user according to the fingerprint image succeeds, and the vehicle personalization parameter of the user is acquired according to the identity information. This allows simple and quick personalized setting of the vehicle, which facilitates sharing a vehicle among family members in most cases.

In addition, the step of collecting a fingerprint image of a user includes: collecting, by a fingerprint sensor integrated in a fingerprint chip of the vehicle, the fingerprint image of the user; the step of authenticating the user according to the fingerprint image and acquiring identity information of the user after the authentication succeeds includes: authenticating, by a microprocessor integrated in the fingerprint chip of the vehicle, the user according to the fingerprint image, and acquiring the identity information of the user after the authentication succeeds. In this embodiment, the fingerprint sensor and the microprocessor are integrated in one fingerprint chip, that is, a fingerprint processing function can be achieved by using a single chip with a relatively small volume.

In addition, the fingerprint sensor is mounted on a start button of the vehicle; when the user's finger presses the start button, the finger faces a fingerprint collection surface of the fingerprint sensor; and after the authenticating, by the fingerprint chip, the user according to the fingerprint image, the method further includes: if the authentication succeeds, notifying, by the microprocessor, a start controller of the vehicle to start the vehicle. In this embodiment, the fingerprint chip is provided on the start button and can achieve fingerprint-based one-button start, which is safe and reliable. That is, in this embodiment, keyless vehicle startup and personalized setting can be completed based on a single fingerprint collection and authentication, which can avoid inconvenient operations for the vehicle owner.

In addition, the method further includes: entering a fingerprint authentication mode when the microprocessor receives a command of enabling a fingerprint authentication function from the start controller; in the fingerprint authentication mode, authenticating, by the microprocessor, the user according to the fingerprint image, and acquiring the identity information of the user after the authentication succeeds; wherein, the command of enabling the fingerprint authentication function is generated by the start controller at least when detecting that the start button is pressed. In this embodiment, there is provided a triggering mode for triggering the microprocessor to enter the fingerprint authentication mode.

In addition, the method further includes: when a central control device of the vehicle detects a fingerprint entry request, disabling, a detection function of the start controller on whether the start button is pressed, and sending a command of enabling a fingerprint entry function to the microprocessor; entering a fingerprint entry mode after the microprocessor receives the command of enabling the fingerprint entry function; in the fingerprint entry mode, generating, by the microprocessor, a fingerprint template according to the fingerprint image, and establishing correspondence between the fingerprint template and the identity information of the user that is received through the central control device. In this embodiment, a signal that the start button is pressed may be shielded during fingerprint entry, which can avoid an unexpected situation such as vehicle stalling that may be caused by the start button being pressed down during the fingerprint collection process.

In addition, the method further includes: performing, by the microprocessor, live detection through an infrared sensor integrated in the fingerprint chip, and authenticating, by the microprocessor, the user according to the fingerprint image, after the detection succeeds. In this embodiment, the fingerprint chip has a live detection function, and fingerprint authentication is performed only after the live detection succeeds, which can prevent a person from using a fake finger to start the vehicle and improve safety of fingerprint-based one-button vehicle start.

BRIEF DESCRIPTION OF THE DRAWINGS

One or more embodiments are exemplarily described through the diagrams in the accompanying drawings. These exemplary embodiments do not constitute a limitation to the embodiments. Parts with same reference signs are denoted as similar parts. Unless otherwise specifically stated, the diagrams in the accompanying drawings do not constitute a limitation of proportion.

DETAILED DESCRIPTION

In order to make objectives, technical details and advantages of the embodiments of the present disclosure more apparent, various embodiments of the present disclosure will be described below in details in connection with the drawings. However, those ordinarily skilled in the art may understand that, in the respective embodiments of the present disclosure, numerous technical details are set forth in order to provide a reader with a better understanding of the present application. However, the technical solutions claimed in the present application can be implemented without these technical details and various changes and modifications based on the embodiments below. The embodiments below are divided for the convenience of description, and should not constitute any limitation to specific implementation manners of the present disclosure; and the embodiments may be combined with each other and mutually referred to without contradiction.

Figure 1:
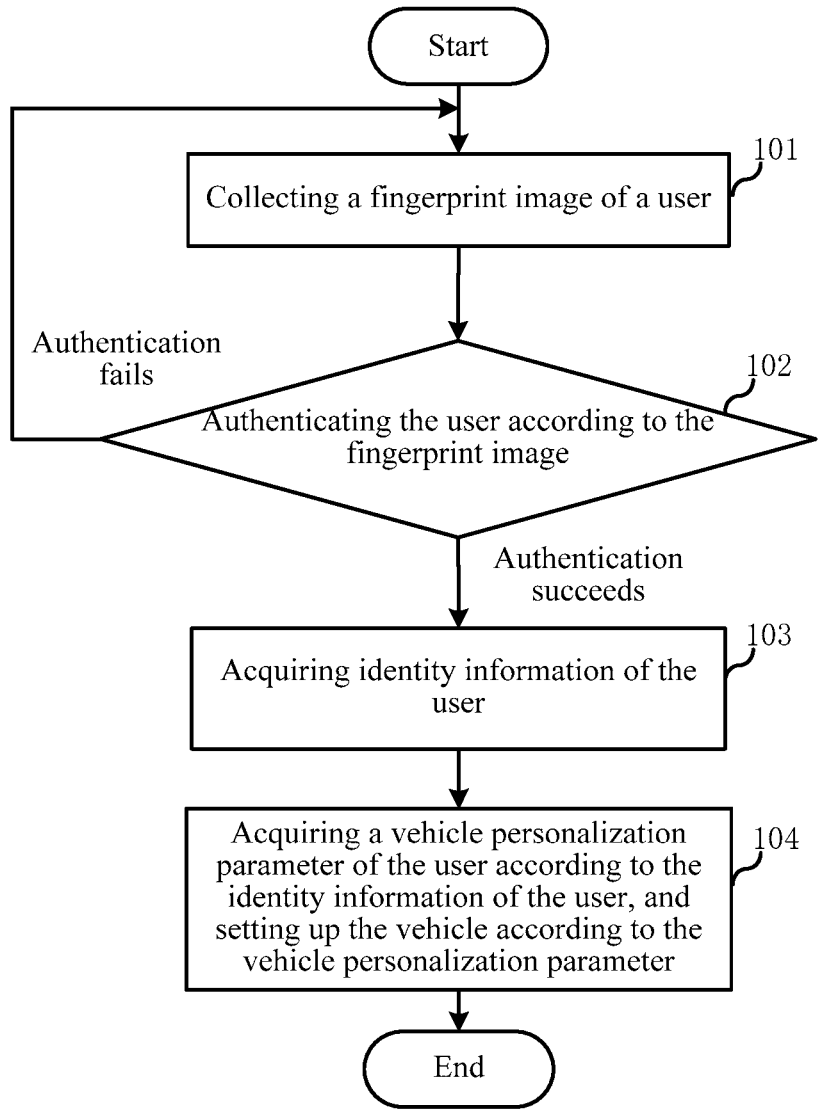
FIG. 1 is a flow chart of a vehicle control method according to a first embodiment of the present disclosure.

As shown in FIG. 1, a first embodiment of the present disclosure relates to a vehicle control method, with specific steps as follows.

Step 101: collecting a fingerprint image of a user.

Step 102: authenticating the user according to the fingerprint image; if the authentication succeeds, the process proceeds to step 103; and if the authentication fails, it returns to step 101.

Step 103: acquiring identity information of the user.

Step 104: acquiring a vehicle personalization parameter of the user according to the identity information of the user, and setting up the vehicle according to the vehicle personalization parameter.

In step 101, when finger touch is detected, the fingerprint image of the user is collected. Step 101 may be executed by a fingerprint sensor; and in an example, the fingerprint sensor is a capacitive sensor. The fingerprint sensor may be provided in the vehicle as needed, in a position such as a steering wheel and a console which is convenient for the user to touch.

Figure 2:
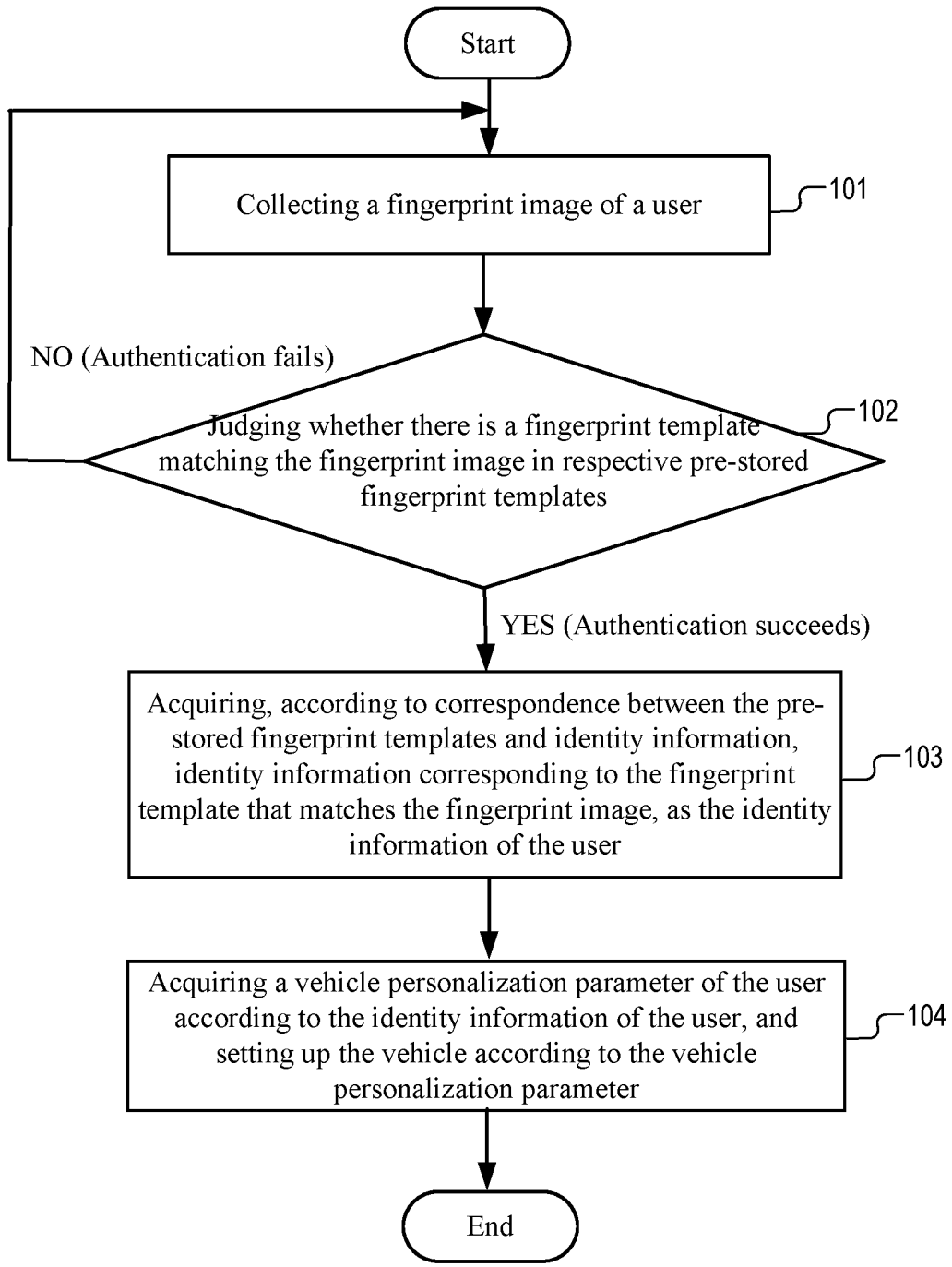
FIG. 2 is a specific flow chart of the vehicle control method according to the first embodiment of the present disclosure.

In an example, as shown in FIG. 2, step 102 is specifically: judging whether there is a fingerprint template matching the fingerprint image in respective pre-stored fingerprint templates; if yes, it indicates that the authentication succeeds, and the process proceeds to step 103; if no, it indicates that the authentication fails, at which time the fingerprint image may be re-collected. Step 103 is specifically: acquiring, according to correspondence between the pre-stored fingerprint templates and identity information, identity information corresponding to the fingerprint template that matches the fingerprint image, as the identity information of the user. It should be noted that, the number of times the authentication fails may be recorded; if the number of times the authentication fails exceeds the preset number of times, the fingerprint image is no longer re-collected and the process ends. Wherein, the identity information of the user may be the user's name and account number, etc., and may be set as needed.

In an example, step 102 and step 103 may be executed by an independent microprocessor, at which time the respective fingerprint templates and identity information corresponding to the respective fingerprint templates may be pre-stored in the microprocessor. In this embodiment, a position for proving the microprocessor will not be limited, as long as it is communicatively connected with the fingerprint sensor.

Step 104 may be executed by a central control device of the vehicle; the central control device is pre-stored with correspondence between the identity information and the vehicle personalization parameter; and the central control device acquires the vehicle personalization parameter corresponding to the identity information of the user, according to the correspondence between the identity information and the vehicle personalization parameter. The vehicle personalization parameter may include parameters of various vehicle-mounted devices inside the vehicle, such as an air conditioning system, an electrically adjustable seat and an entertainment apparatus.

That is, the microprocessor outputs the identity information of the user to the central control device of the vehicle when the authentication succeeds; while outputs information that the authentication fails to the central control device when the authentication fails. The microprocessor may also output no information when the authentication fails.

It should be noted that in some example step 102 and step 103 may also be executed by the central control device of the vehicle, at which time the respective fingerprint templates and the identity information corresponding to the respective fingerprint templates may be pre-stored in the central control device.

As compared with existing technologies, in the embodiment of the present disclosure, the identity information of the user is acquired after the authentication of the user according to the fingerprint image succeeds, and the vehicle personalization parameter of the user is acquired according to the identity information, so as to implement personalized setting of the vehicle simply and quickly, which can facilitate sharing a vehicle among family members in most cases.

A second embodiment of the present disclosure relates to a vehicle control method. The second embodiment is substantially the same as the first embodiment, and a main difference is that: in the second embodiment of the present disclosure, a fingerprint sensor and a microprocessor are integrated together.

Specifically, the fingerprint sensor may be provided on an upper surface of the microprocessor, and then the fingerprint sensor and the microprocessor are packaged to form a whole by using a packaging technology, which is referred to as a fingerprint chip; and a fingerprint collection surface of the fingerprint sensor serves as a fingerprint collection surface of the fingerprint chip. The fingerprint chip has an independent fingerprint recognition function and is small in size, which may be mounted anywhere in the vehicle as needed.

A third embodiment of the present disclosure relates to a vehicle control method. The third embodiment is substantially the same as the second embodiment, and a main difference is that: in the third embodiment, a fingerprint chip is mounted on a start button of the vehicle, and when a user's finger presses the start button, the finger faces a fingerprint collection surface of a fingerprint sensor, so as to implement fingerprint-based one-button start. Wherein, the finger presses on a pressing surface of the start button, and the pressing surface may be a protective cover provided on the fingerprint collection surface, but it is not limited thereto.

Figure 3:
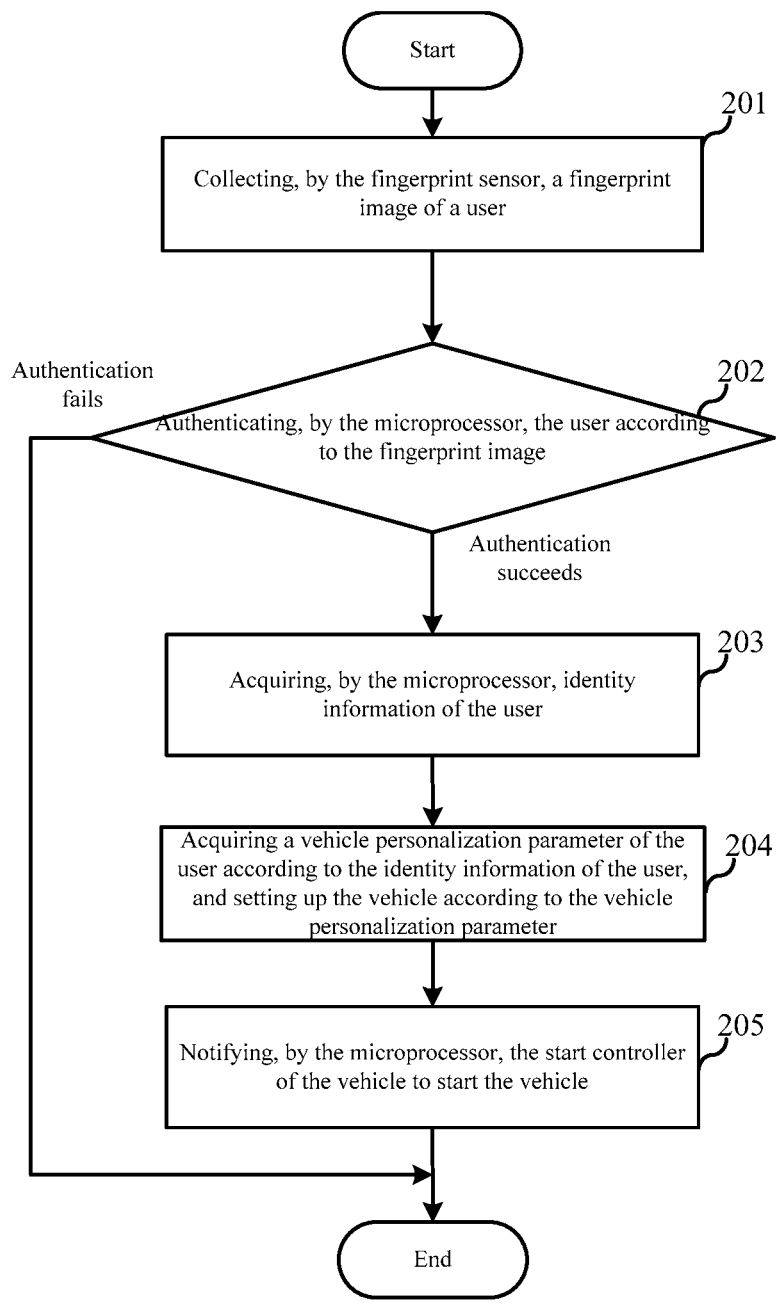
FIG. 3 is a flow chart of a vehicle control method according to a third embodiment of the present disclosure.

FIG. 3 shows a flow chart of the vehicle control method according to the third embodiment, wherein, steps 201 to 204 are substantially the same as steps 101 to 104, so no details will be repeated here; and a difference is that, the method further includes step 205: notifying, by the microprocessor, the start controller of the vehicle to start the vehicle. That is, after the authentication succeeds, the microprocessor further notifies the start controller of the vehicle to start the vehicle.

In this embodiment, keyless vehicle startup and personalized setting can be completed based on a single fingerprint collection and authentication, which greatly reduces cumbersome operations for the owner of the vehicle. It should be noted that, after the authentication succeeds, vehicle startup and personalized setting are executed in no particular sequential order, that is, an execution sequence of step 205 and step 203 and step 204 shown in FIG. 3 is only an example, and it is not limited thereto.

In an example, the microprocessor may further determine whether to notify the start controller of the vehicle to start the vehicle in combination with other preset condition; for example, the microprocessor may notify the start controller of the vehicle to start the vehicle when detecting a brake signal and detecting that the authentication succeeds.

In an example, the microprocessor may further accumulate the number of times the authentication fails in step 202; when the number of times the authentication fails reaches the preset number of times, measures such as an alarm or a lock on the vehicle may be taken to improve safety of keyless vehicle start.

Figure 4:
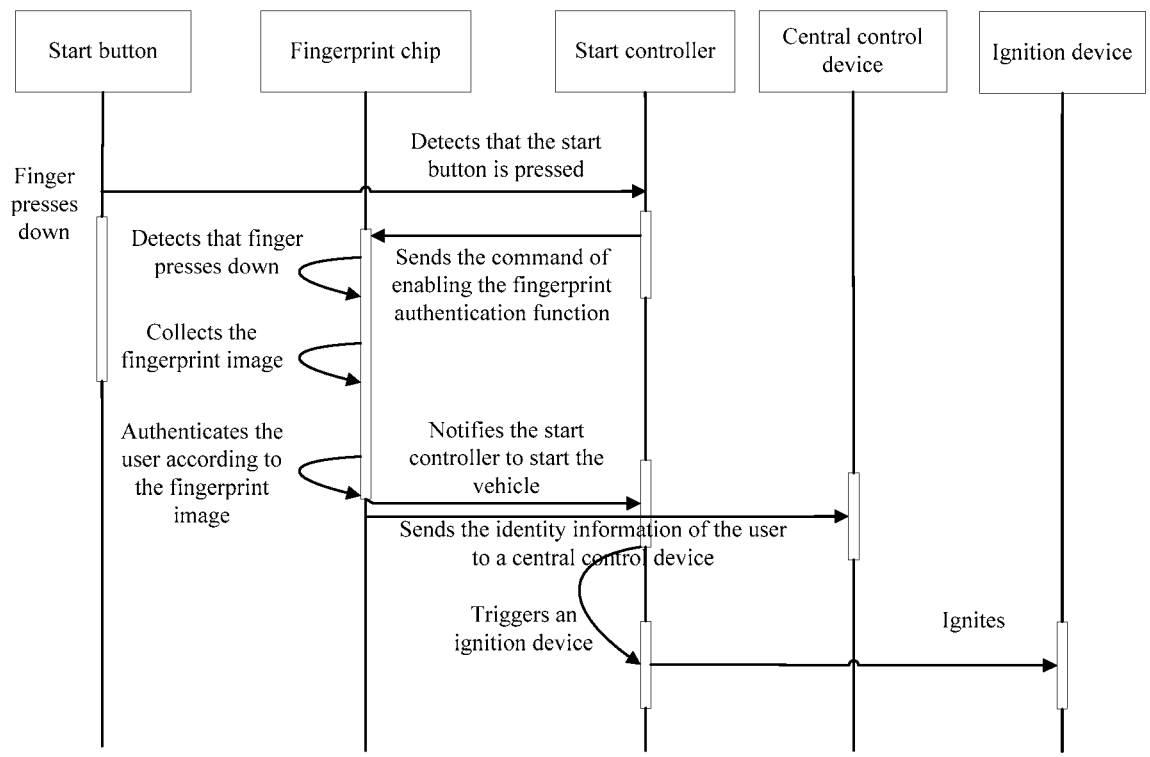
FIG. 4 is a schematic diagram of interaction of respective devices in a vehicle control system according to the third embodiment of the present disclosure.

In an example, when receiving a command of enabling a fingerprint authentication function from the start controller, the microprocessor enters a fingerprint authentication mode; wherein, the command of enabling the fingerprint authentication function is generated by the start controller at least when it detects that the start button is pressed. FIG. 4 shows a schematic diagram of interaction of respective devices in a vehicle control system.

Specifically, when the finger presses down the start button, the start controller detects that the start button is pressed, and sends the command of enabling the fingerprint authentication function to the microprocessor; and in the example, the microprocessor is integrated in the fingerprint chip. When receiving the command of enabling the fingerprint authentication function, the microprocessor enters the fingerprint authentication mode. In the fingerprint authentication mode, the microprocessor authenticates the user according to a fingerprint image, and after the authentication succeeds, the microprocessor notifies the start controller of the vehicle to start the vehicle, so that the start controller, after receiving the notification, triggers an ignition device of the vehicle to ignite; in addition, the microprocessor acquires identity information of the user and sends the identity information of the user to a central control device; the central control device acquires a vehicle personalization parameter of the user according to the identity information of the user, and sets up the vehicle according to the vehicle personalization parameter.

When the finger presses down the start button, the finger faces the fingerprint collection surface of the fingerprint sensor, and the fingerprint sensor collects the fingerprint image; that is, the fingerprint sensor collects the fingerprint image without being affected by whether the microprocessor enters the fingerprint authentication mode; the fingerprint sensor executes an action of collecting the fingerprint image once detecting the finger; and the microprocessor authenticates the fingerprint image collected by the fingerprint sensor only after entering the fingerprint authentication mode. FIG. 4 is only schematic illustration, and a sequential order in which the fingerprint sensor collects the fingerprint image and the microcontroller enters the fingerprint authentication mode will not be limited.

Further, the microprocessor also has a fingerprint entry mode. Specifically, after receiving a command of enabling a fingerprint entry function, the microprocessor enters a fingerprint entry mode; in the fingerprint entry mode, the microprocessor generates a fingerprint template according to the fingerprint image, and establishes correspondence between the fingerprint template and the identity information of the user that is received through the central control device. In this embodiment, the user may input a fingerprint entry request to the central control device, and the central control device, when detecting the fingerprint entry request, sends the command of enabling the fingerprint entry function to the microprocessor.

Under normal circumstances, when the user needs to enter a fingerprint, the user firstly inputs the fingerprint entry request to the central control device through an input apparatus and inputs the identity information of the user; then, the user places his/her finger on the fingerprint sensor for fingerprint collection; so usually the fingerprint sensor collects the fingerprint image after the microprocessor enters the fingerprint entry mode. However, it should be noted that, the fingerprint sensor may collect the fingerprint image without being affected by whether the microprocessor has entered the fingerprint entry mode; that is, the fingerprint sensor collects the fingerprint image once detecting the finger.

A fourth embodiment of the present disclosure relates to a vehicle control method, the fourth embodiment is substantially the same as the third embodiment, and a main difference is that: in the fourth embodiment, when sending a command of enabling a fingerprint entry function to a microprocessor, a central control device disables a function for detecting, by a start controller, whether a start button is pressed.

Figure 5:
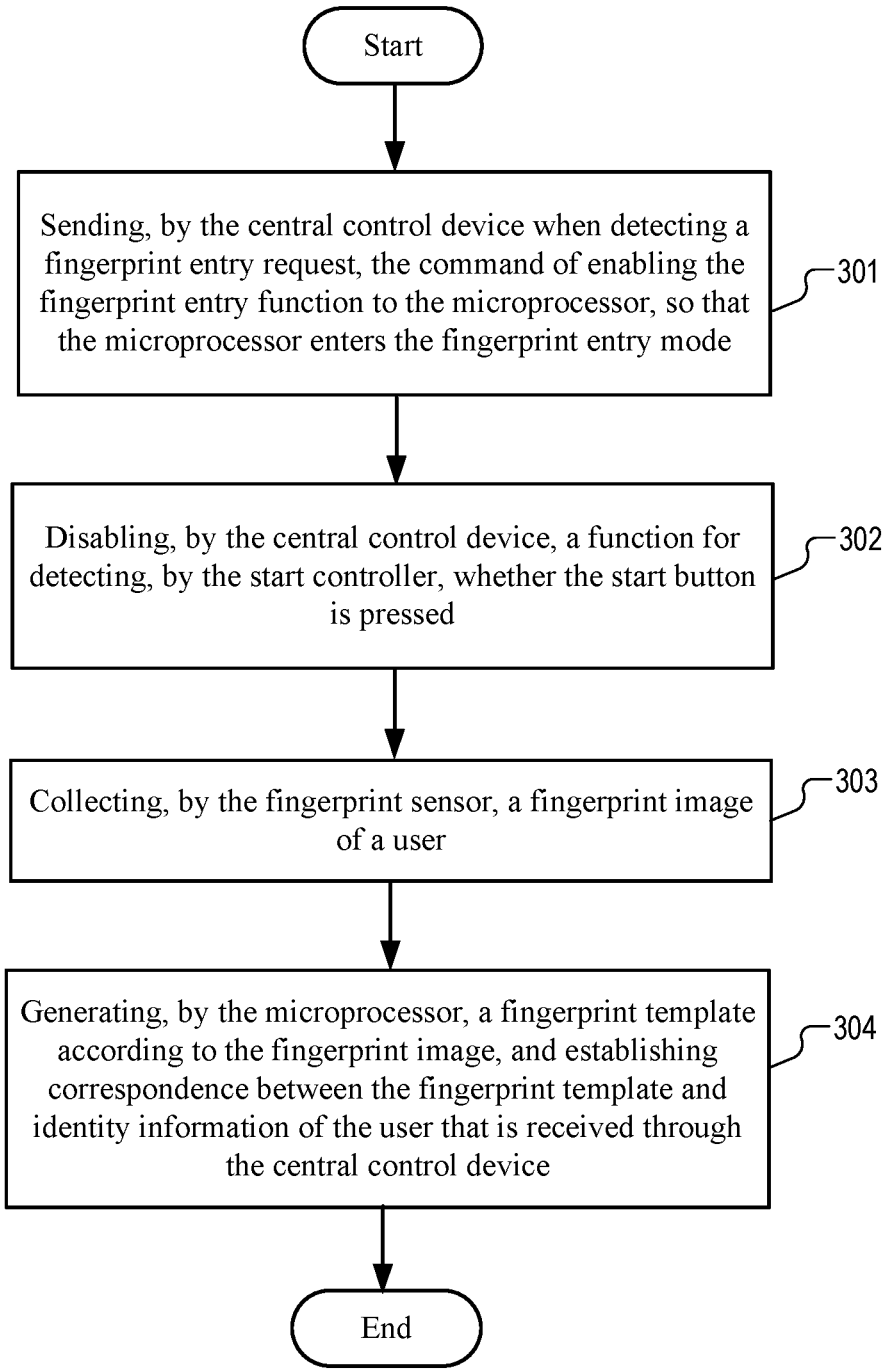
FIG. 5 is a flow chart of a microcontroller entering a fingerprint entry mode according to a fourth embodiment of the present disclosure.

FIG. 5 shows a flow chart of a microcontroller entering a fingerprint entry mode according to the fourth embodiment of the present disclosure. Specific steps are as follows:

Step 301: sending, by the central control device when detecting a fingerprint entry request, the command of enabling the fingerprint entry function to the microprocessor, so that the microprocessor enters the fingerprint entry mode.

That is, the microprocessor enters the fingerprint entry mode when receiving the command of enabling the fingerprint entry function.

Step 302: disabling, by the central control device, a function for detecting, by the start controller, whether the start button is pressed.

Step 303: collecting, by the fingerprint sensor, a fingerprint image of a user.

Step 304: generating, by the microprocessor, a fingerprint template according to the fingerprint image, and establishing correspondence between the fingerprint template and identity information of the user that is received through the central control device.

In this embodiment, a signal that the start button is pressed may be shielded during fingerprint entry, which can avoid an unexpected situation such as vehicle stalling that may be caused by the start button being pressed down during the fingerprint collection process.

A fifth embodiment of the present disclosure relates to a vehicle control method, the fifth embodiment is an improvement based on any one of the first embodiment to the fourth embodiment, and a main improvement is that: in the fifth embodiment, live detection may further be performed, and when the detection succeeds, a user is authenticated according to a fingerprint image.

Figure 6:
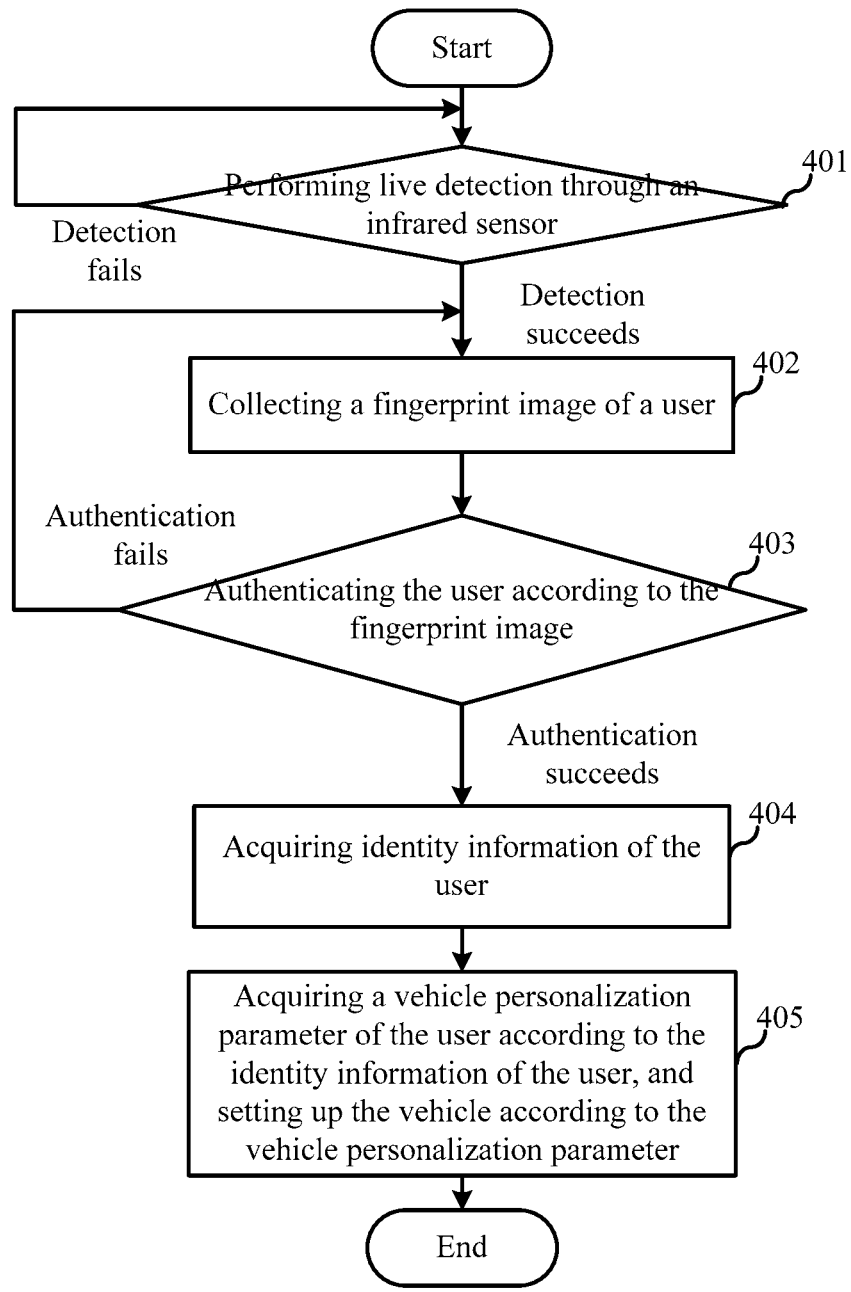
FIG. 6 is a flow chart of a vehicle control method according to a fifth embodiment of the present disclosure.

FIG. 6 is a flow chart of a vehicle control method according to the fifth embodiment of the present disclosure, where steps 402 to 405 are substantially the same as steps 101 to 104, so no details will be repeated here; and a difference is that, the method further includes:

Step 401: performing live detection through an infrared sensor; if the detection succeeds, the process proceeds to step 402; and if the detection fails, it returns to step 401. Wherein, the number of times the live detection fails may be recorded; and if the number of times reaches a preset value, it may be considered that the authentication fails.

Specifically, the infrared sensor collects an infrared image of a finger, and the microprocessor performs live recognition on the finger based on the infrared image; if it is recognized as a live finger, the microprocessor authenticates the fingerprint image collected by a fingerprint sensor. That is, it may be understood as that, after entering a fingerprint authentication mode, the microprocessor firstly performs live recognition on the finger based on the infrared image, and after the live detection succeeds, authenticates the fingerprint image collected by the fingerprint sensor.

The infrared sensor may be integrated in the fingerprint chip, and step 401 is executed by the microprocessor, that is, the microprocessor performs live detection through the infrared sensor integrated in the fingerprint chip. The fingerprint chip further has a live detection function, and fingerprint authentication is performed only after the live detection succeeds, which, thus, can avoid a malicious person from using a fake finger to start the vehicle when implementing fingerprint-based keyless startup, so as to improve safety of fingerprint-based one-button vehicle startup.

In this embodiment, after the live detection function is added, the microprocessor, only in a case where the live detection succeeds and the fingerprint image authentication succeeds, determines that the user authentication succeeds, and outputs the identity information of the user to a central control device of the vehicle; while in a case where the live detection fails or the fingerprint image authentication fails, determines that the user authentication fails, and outputs information that the authentication fails to the central control device. That is, regardless of whether or not the live detection function is added, a result output by the microprocessor is either the identity information of the user or the information that the authentication fails.

The steps of the above various methods are divided only for clarity of description; when implemented, the steps may be merged to one step or some steps may be split into a plurality of steps, which are all within the protection scope of this patent as long as they include a same logical relationship; additions of insignificant modifications or introductions of insignificant design to algorithms or processes without changing core design of the algorithms and processes, are all within the protection scope of this patent.

Figure 7:
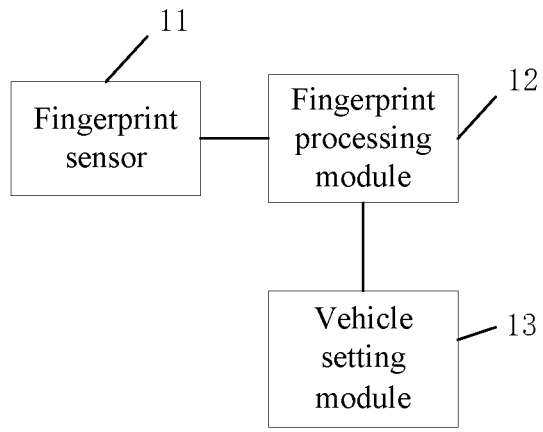
FIG. 7 is a schematic diagram of an example of a vehicle control system according to a sixth embodiment of the present disclosure.

A sixth embodiment of the present disclosure relates to a vehicle control system; and in an example shown in FIG. 7, the vehicle control system includes: a fingerprint sensor 11, a fingerprint processing module 12 and a vehicle setting module 13; wherein, the fingerprint processing module 12 is respectively connected with the fingerprint sensor 11 and the vehicle setting module 13. The fingerprint sensor 11 is configured to collect a fingerprint image of a user; the fingerprint processing module 12 is configured to authenticate the user according to the fingerprint image, and acquire identity information of the user after the authentication succeeds; and the vehicle setting module 13 is configured to acquire a vehicle personalization parameter of the user according to the identity information of the user, and set up the vehicle according to the vehicle personalization parameter.

The fingerprint processing module 12 includes a processing unit and a storage unit; the storage unit is pre-stored with respective fingerprint templates and identity information corresponding to the respective fingerprint templates. The storage unit is configured to judge whether there is a fingerprint template matching the fingerprint image in the respective fingerprint templates; if yes, it indicates that the authentication succeeds; and the identity information corresponding to the fingerprint template that matches the fingerprint image is acquired as the identity information of the user.

In an example, the fingerprint processing module 12 may be a microprocessor, and the vehicle setting module 13 may be integrated in a central control device of the vehicle.

In an example, the microprocessor and the fingerprint sensor 11 may be integrated in a fingerprint chip.

Figure 8:
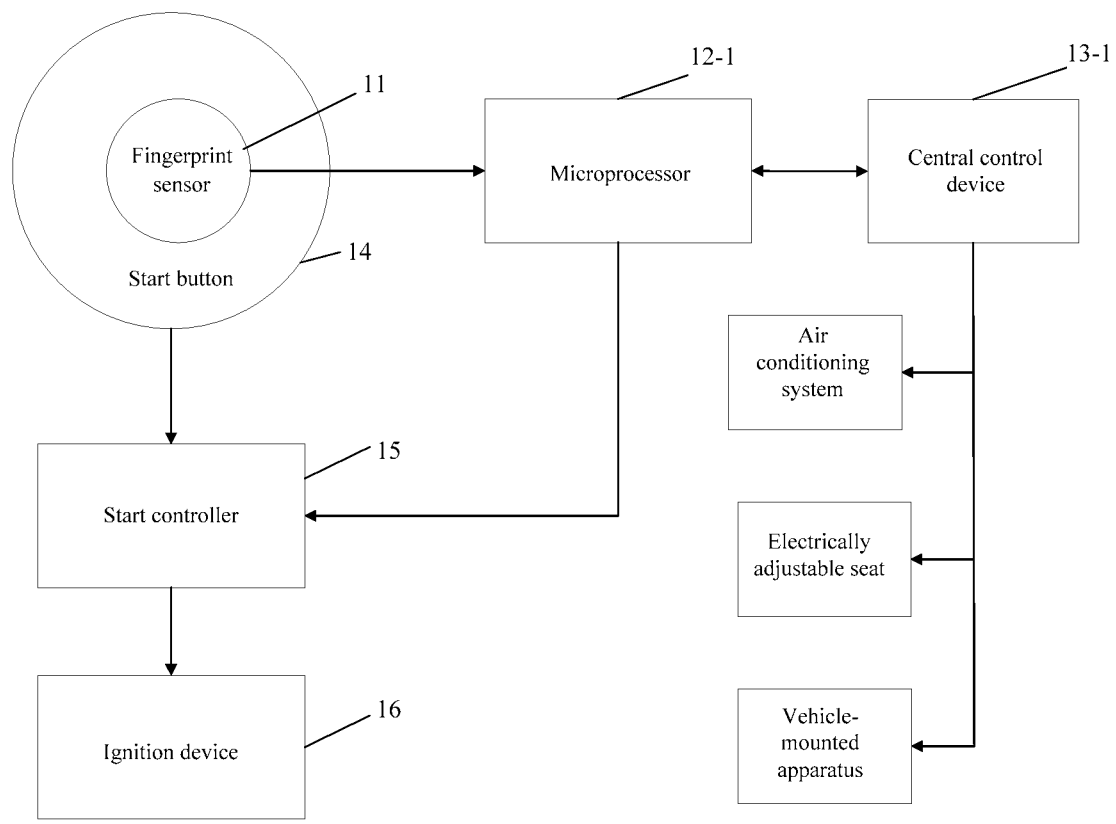
FIG. 8 is a schematic diagram of another example of the vehicle control system according to the sixth embodiment of the present disclosure.

In an example, as shown in FIG. 8, the fingerprint sensor 11 may be mounted on a start button 14 of the vehicle, and when the user' finger presses the start button, the finger faces a fingerprint collection surface of the fingerprint sensor 11;

the microprocessor 12-1 is further configured to notify a start controller 15 of the vehicle to start the vehicle after the authentication succeeds, so that the start controller triggers an ignition device 16 to ignite. It should be noted that, in order to more intuitively embody that the fingerprint sensor 11 is mounted on the start button 14 of the vehicle in FIG. 8, a graphic outline of the fingerprint sensor 11 is drawn within a graphic outline of the start button 14, the fingerprint sensor 11 and the microprocessor 12-1 are separately represented, and a signal connection relationship between the two is represented by a connection line; however, it is not limited thereto, when the fingerprint sensor 11 and the microprocessor 12-1 are packaged together, the fingerprint chip is mounted on the start button, a position where the fingerprint sensor 11 is located in FIG. 8 is just the fingerprint chip, and the fingerprint collection surface of the fingerprint sensor 11 is just a fingerprint collection surface of the fingerprint chip. In addition, an air conditioning system, an electrically adjustable seat, and a vehicle-mounted entertainment device shown in FIG. 8 are all vehicle-mounted devices in the vehicle, which are merely illustrative here and not limited thereto; and the central control device may perform personalized setting on the vehicle-mounted devices according to vehicle personalization parameters of the user.

The microprocessor 12-1 is further configured to enter a fingerprint authentication mode after receiving a command of enabling a fingerprint authentication function from the start controller 15; in the fingerprint authentication mode, the microprocessor 12-1 authenticates the user according to the fingerprint image, and acquires the identity information of the user after the authentication succeeds; wherein, the start controller 15 generates the command of enabling the fingerprint authentication function at least when detecting that the start button 14 is pressed.

The vehicle further includes a fingerprint entry assisting module; and the fingerprint entry assisting module is configured to disable, when detecting a fingerprint entry request, a function for detecting, by the start controller 15, whether the start button is pressed, and sending a command of enabling a fingerprint entry function to the microprocessor. The microprocessor 12-1 is further configured to enter a fingerprint entry mode after receiving the command of enabling the fingerprint entry function; in the fingerprint entry mode, the microprocessor generates a fingerprint template according to the fingerprint image, and establishes correspondence between the fingerprint template and the identity information of the user that is received through the fingerprint entry assisting module. Wherein, the fingerprint entry assisting module may be integrated together with the vehicle setting module in the central control device 13-1 of the vehicle.

In an example, the fingerprint chip is further integrated therein with an infrared sensor; and the microprocessor 12-1 is further configured to perform live detection through the infrared sensor, and authenticate the user according to the fingerprint image after the detection succeeds.

It is not difficult to find that, this embodiment is a system embodiment corresponding to any one of the first embodiment to the fifth embodiment, and this embodiment may be implemented in cooperation with any one of the first embodiment to the fifth embodiment. The related technical details as mentioned in any one of the first embodiment to the fifth embodiment are still valid in this embodiment, and no details will be repeated here in order to reduce repetition. Accordingly, the related technical details as mentioned in this embodiment are also applicable to any one of the first embodiment to the fifth embodiment.

It is worth mentioning that, respective modules involved in this embodiment are all logical modules; in actual application, a logical unit may be a physical unit, or may also be a portion of a physical unit, or may also be implemented with a combination of a plurality of physical units. In addition, in order to highlight an innovative part of the present disclosure, this embodiment does not introduce units that are not closely related to solving the technical problem proposed by the present disclosure, but this does not mean that there are no other units in this embodiment.

A seventh embodiment of the present disclosure relates to a fingerprint chip, the fingerprint chip is mounted on a vehicle, and has a fingerprint sensor and a microprocessor integrated therein; the fingerprint sensor is configured to collect a fingerprint image of a user; the microprocessor is configured to authenticate the user according to the fingerprint image, and acquire identity information of the user after the authentication succeeds, so that a central control device of the vehicle acquires a vehicle personalization parameter of the user according to the identity information of the user, and sets up the vehicle according to the vehicle personalization parameter.

In an example, the fingerprint chip is mounted on a start button of the vehicle; when the user's finger presses the start button, the finger faces a fingerprint collection surface of a fingerprint sensor; and the microprocessor is further configured to notify a start controller of the vehicle to start the vehicle, after the authentication succeeds.

In an example, the microprocessor includes a processing unit and a storage unit; the storage unit is pre-stored with respective fingerprint templates and identity information corresponding to the respective fingerprint templates; the storage unit is configured to judge whether there is a fingerprint template matching the fingerprint image in the respective fingerprint templates; if yes, it indicates that the authentication succeeds; and the identity information corresponding to the fingerprint template that matches the fingerprint image is acquired as the identity information of the user.

In an example, the fingerprint chip is further integrated therein with an infrared sensor; and the microprocessor is further configured to perform live detection through the infrared sensor, and authenticate the user according to the fingerprint image after the detection succeeds.

It is not difficult to find that, the fingerprint chip according to this embodiment is just the fingerprint chip in the vehicle control system according to the sixth embodiment, the related technical details as mentioned in the sixth embodiment are still valid in this embodiment, and no details will be repeated here in order to reduce repetition. Accordingly, the related technical details as mentioned in this embodiment are also applicable to the sixth embodiment.

Those skilled in the art may understand that implementation of all or part of the steps in the methods according to the above-described embodiments may be completed by related hardware as instructed by a program; the program may be stored in a storage medium, and include a plurality of instructions so that a device (which may be a single chip microcomputer and a chip, etc.) or a processor executes all or part of the steps of the methods as described in the respective embodiments of the present application. The foregoing storage medium includes: various media that can store program codes, such as a USB flash disk, a mobile hard disk, a read-only memory (ROM), a random access memory (RAM), a magnetic disk or an optical disk.

Those ordinarily skilled in the art may understand that, the above-described respective embodiments are specific embodiments for implementing the present disclosure, and in actual application, various changes can be made in forms and details without departing from the spirit and scope of the present disclosure.

What is claimed is:

1. A method for controlling a vehicle, applied to the vehicle that comprises a fingerprint chip mounted on a start button of the vehicle, the fingerprint chip comprising a fingerprint sensor, such that when a finger of a user presses the start button, the finger faces a fingerprint collection surface of the fingerprint sensor, comprising:

collecting, by the fingerprint sensor, a fingerprint image of a user;

entering a fingerprint authentication mode when a microprocessor integrated in the fingerprint chip of the vehicle receives a command of enabling a fingerprint authentication function from a start controller; wherein the command of enabling the fingerprint authentication function is generated by the start controller at least when detecting that the start button is pressed;

in the fingerprint authentication mode, authenticating the user according to the fingerprint image and acquiring identity information of the user after the authentication succeeds; and acquiring a vehicle personalization parameter of the user according to the identity information of the user and setting up the vehicle according to the vehicle personalization parameter;

the method further comprising:

when detecting a fingerprint entry request, disabling a detection function of the start controller on whether a start button is pressed, and sending a command of enabling a fingerprint entry function to a microprocessor;

entering a fingerprint entry mode after the microprocessor receives the command of enabling the fingerprint entry function; and in the fingerprint entry mode, generating, by the microprocessor, a fingerprint template according to the fingerprint image, and establishing correspondence between the fingerprint template and the identity information of the user that is received through a central control device of the vehicle.

2. The method according to claim 1, wherein authenticating the user according to the fingerprint image and acquiring identity information of the user after the authentication succeeds comprises:

authenticating, by the microprocessor integrated in the fingerprint chip of the vehicle, the user according to the fingerprint image and acquiring the identity information of the user after the authentication succeeds.

3. The method according to claim 2, wherein after authenticating the user, by the microprocessor according to the fingerprint image, the method further comprises:

upon the authentication succeeding, notifying, by the microprocessor, the start controller of the vehicle to start the vehicle.

4. The method according to claim 2, wherein the method further comprises:

performing, by the microprocessor, live detection through an infrared sensor integrated in the fingerprint chip, and authenticating, by the microprocessor, the user according to the fingerprint image after the detection succeeds.

5. The method according to claim 2, wherein after authenticating the user, by the microprocessor according to the fingerprint image, the method further comprising:

upon the authentication failing, re-collecting the fingerprint image and recording a number of times the authentication fails; and stopping re-collecting the fingerprint image when the number of times exceeds a preset number of times.

6. The method according to claim 5, further comprising:

after authenticating the user by the microprocessor according to the fingerprint image, when the number of times the authentication fails reaches a preset number of times, taking measures of an alarm and/or a lock on the vehicle.

7. The method according to claim 2, further comprising:

after authenticating the user, by the microprocessor according to the fingerprint image:

upon the authentication succeeding, outputting the identity information of the user to the central control device of the vehicle; acquiring, by the central control device of the vehicle, a vehicle personalization parameter of the user according to the identity information of the user; and setting up, by the central control device of the vehicle, the vehicle according to the vehicle personalization parameter; and upon the authentication failing, outputting information that the authentication fails to the central control device or outputting no information to the central control device.

8. The method according to claim 2, further comprising:

after authenticating the user by the microprocessor according to the fingerprint image, upon the authentication succeeding and a brake signal is detected, notifying, by the microprocessor, the start controller of the vehicle to start the vehicle.

9. The method according to claim 1, wherein the step of authenticating the user according to the fingerprint image and acquiring identity information of the user after the authentication succeeds comprises:

judging whether there is a fingerprint template matching the fingerprint image in respective pre-stored fingerprint templates, wherein a positive judgement indicates that the authentication succeeds; and acquiring, according to correspondence between the pre-stored fingerprint templates and identity information, identity information corresponding to the fingerprint template that matches the fingerprint image, as the identity information of the user.

10. A system for controlling a vehicle, comprising:

a fingerprint sensor configured to collect a fingerprint image of a user;

a start controller configured to generate a command of enabling a fingerprint authentication function at least when detecting that a start button is pressed;

a fingerprint processing module configured to:

enter a fingerprint authentication mode after receiving a command of enabling a fingerprint authentication function from the start controller, in the fingerprint authentication mode authenticate the user according to the fingerprint image and acquire identity information of the user after the authentication succeeds; and enter a fingerprint entry mode after receiving a command of enabling a fingerprint entry function; and in the fingerprint entry mode, generate a fingerprint template according to the fingerprint image, and establish correspondence between the fingerprint template and the identity information of the user that is received through a fingerprint entry assisting module;

a vehicle setting module configured to:
acquire a vehicle personalization parameter of the user according to the identity information of the user; and
set up the vehicle according to the vehicle personalization parameter; and the fingerprint entry assisting module configured to:
when detecting a fingerprint entry request, disable a detection function of the start controller on whether the start button is pressed and send the command of enabling the fingerprint entry function to the fingerprint processing module.

11. The system according to claim 10, wherein the fingerprint processing module is a microprocessor, and the fingerprint sensor and the microprocessor are integrated in a fingerprint chip.

12. The system according to claim 11, wherein the fingerprint chip is mounted on a start button of the vehicle; and when the user's finger presses the start button, the finger faces a fingerprint collection surface of the fingerprint sensor; and
the microprocessor is further configured to notify a start controller of the vehicle to start the vehicle after the authentication succeeds.

13. The system according to claim 11, wherein the fingerprint chip is further integrated with an infrared sensor; and
the microprocessor is further configured to perform live detection through the infrared sensor, and authenticate the user according to the fingerprint image after the detection succeeds.

14. The system according to claim 10, wherein the fingerprint entry assisting module is integrated together with the vehicle setting module in a central control device of the vehicle.

15. The system according to claim 10, wherein the fingerprint processing module comprises a processing unit and a storage unit; and
wherein the storage unit is pre-stored with respective fingerprint templates and identity information corresponding to the respective fingerprint templates;
wherein the storage unit is configured to:
judge whether there is a fingerprint template matching the fingerprint image in the respective fingerprint templates, wherein a positive judgement indicates that the authentication succeeds; and
acquire the identity information corresponding to the fingerprint template that matches the fingerprint image as the identity information of the user.

16. A fingerprint chip, wherein the fingerprint chip is mounted on a start button of a vehicle and the start button of the vehicle is connected to a start controller of the vehicle, and the fingerprint chip comprises:
a fingerprint sensor configured to collect a fingerprint image of a user and when a finger of the user presses the start button, the finger faces a fingerprint collection surface of the fingerprint sensor integrated in the fingerprint chip; and
a microprocessor configured to:
receive a command of enabling a fingerprint entry function when a fingerprint entry request is detected, wherein a detection function of the start controller on whether the start button is pressed is disabled when the fingerprint entry request is detected,
enter a fingerprint authentication mode when receiving a command of enabling a fingerprint authentication function from the start controller, wherein the command of enabling the fingerprint authentication function is generated by the start controller at least when detecting that the start button is pressed; and
in the fingerprint authentication mode, authenticate the user according to the fingerprint image, and acquire identity information of the user after the authentication succeeds, so that a central control device of the vehicle acquires a vehicle personalization parameter of the user according to the identity information of the user and sets up the vehicle according to the vehicle personalization parameter.

17. The fingerprint chip according to claim 16, wherein
the microprocessor is further configured to notify the start controller of the vehicle to start the vehicle after the authentication succeeds.

18. The fingerprint chip according to claim 16, wherein the microprocessor includes a processing unit and a storage unit;
the storage unit is pre-stored with respective fingerprint templates and identity information corresponding to the respective fingerprint templates; and
the storage unit is configured to:
judge whether there is a fingerprint template matching the fingerprint image in the respective fingerprint templates, wherein a positive judgement indicates that the authentication succeeds; and
acquire the identity information corresponding to the fingerprint template that matches the fingerprint image as the identity information of the user.

19. The fingerprint chip according to claim 16, wherein the fingerprint chip is further integrated with an infrared sensor; and
the microprocessor is further configured to perform live detection through the infrared sensor and authenticate the user according to the fingerprint image after the detection succeeds.

* * * * *